Figure 1:
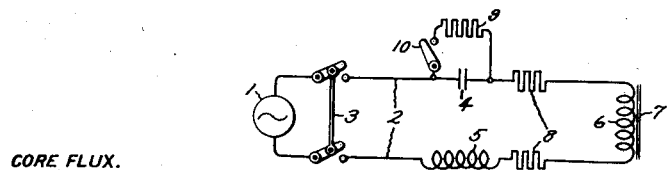

June 14, 1938.　　　R. C. BUELL　　　2,120,855
ELECTRIC CIRCUIT
Filed Aug. 10, 1937　　　2 Sheets-Sheet 1

----- } NORMAL OPERATION - SHUNT.
――― } RESISTOR BELOW CRITICAL VALUE.

----- } ABNORMAL OPERATION - SHUNT.
――― } RESISTOR ABOVE CRITICAL VALUE.

Inventor:
Roy C. Buell,
by Harry E. Dunham
His Attorney.

June 14, 1938.  R. C. BUELL  2,120,855
ELECTRIC CIRCUIT
Filed Aug. 10, 1937  2 Sheets-Sheet 2
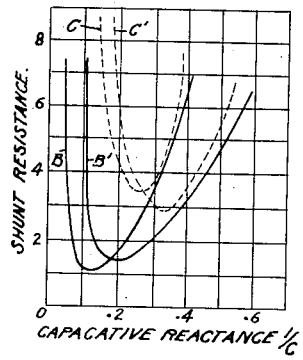
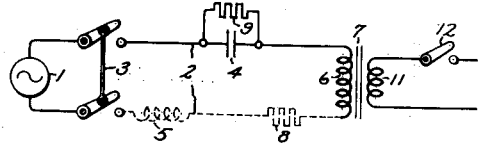 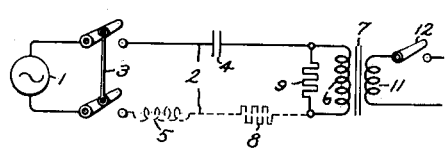
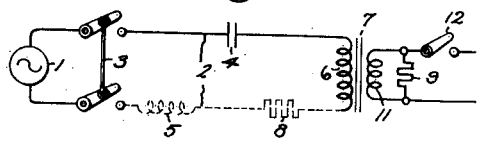 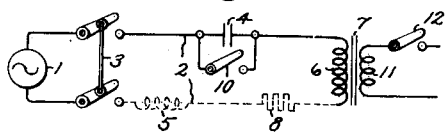
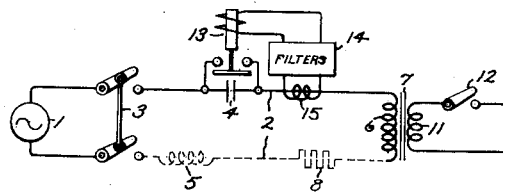
Inventor:
Roy C. Buell,
by Harry E. Dunham
His Attorney.

Patented June 14, 1938

2,120,855

UNITED STATES PATENT OFFICE 2,120,855

ELECTRIC CIRCUIT

Roy C. Buell, Schenectady, N. Y., assignor to General Electric Company, a corporation of New York Application August 10, 1937, Serial No. 158,344

9 Claims. (Cl. 171—97)

My invention relates to electric circuits and more particularly to the protection of electric circuits against the occurrence or continuance therein of certain abnormal operating conditions. More particularly, my invention relates to the protection of alternating current circuits which include series capacitance and saturable core inductance from sustained abnormal frequency and abnormally high magnitude exciting or magnetizing currents for the saturable inductance.

A concrete example of an application of my invention is to alternating current power distribution and transmission circuits which contain one or more series capacitors. The primary function of a series capacitor is to neutralize at least a portion of the distributed series inductive reactance of such circuits thereby improving their inherent voltage regulation and increasing the power limits of systems by which they are interconnected. For purposes of economy the voltage of such circuits is usually considerably higher than the rated voltage of most consumption devices and consequently so-called distribution transformers are usually interposed between such circuits and the various loads which are connected to them.

If little or no load is applied to such circuits, it has been found that sometimes when they are connected to an alternating current source the transformer exciting current becomes decidedly abnormal and this abnormal condition persists indefinitely. This abnormality is characterized both as to magnitude and frequency. The magnitude is typically of the order of magnitude of the transformer full load current while the frequency is typically one-third the supply frequency but it is sometimes higher than this and it is sometimes lower than this. Such operation is highly undesirable in that it results in very inefficient operation and badly distorted transformer secondary voltages.

I have discovered that these abnormal exciting currents can be prevented by the addition of a small load to the transformer or to the circuit, either connected permanently or temporarily thereto, or by temporarily short circuiting the capacitor.

An object of my invention is to provide a new and improved electric circuit.

Another object of my invention is to provide protective means for circuits containing series capacitance and saturable inductance.

A further object of my invention is to provide protective means for distribution circuits containing series capacitors.

My invention will be better understood from the following description taken in connection with the accompanying drawings and its scope will be pointed out in the appended claims.

Figure 2:
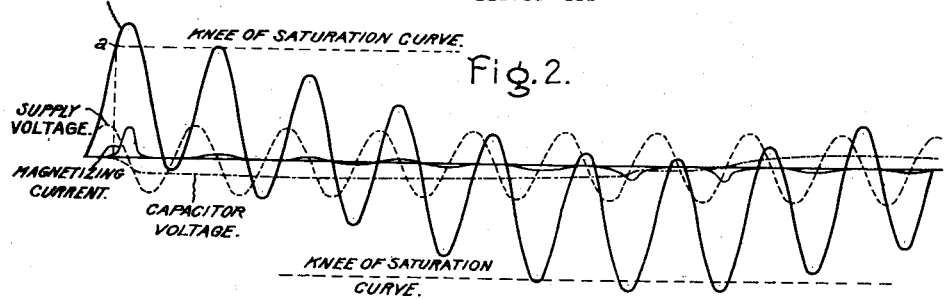
Figure 3:
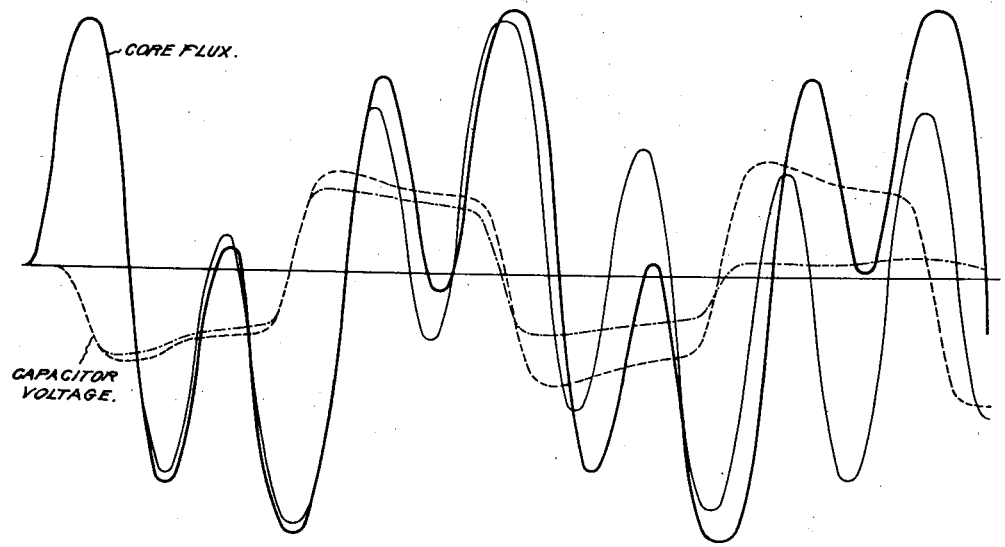

In the drawings, Fig. 1 is a diagrammatic showing of a circuit embodying one form of my invention; Fig. 2 is a reproduction from a set of oscillograms which illustrate the abnormal phenomena which my invention eliminates; Fig. 3 is a reproduction from a set of oscillograms illustrating operating conditions in circuit 1 for different critical values of shunt protective resistance; Fig. 4 is a set of curves illustrating the relationship between protective shunt resistance and capacitive reactance; Fig. 5 illustrates diagrammatically an embodiment of my invention applied to a power distribution circuit; while Figs. 6, 7, 8 and 9 illustrate further modifications thereof.

Referring now to the drawings, and more particularly to Fig. 1, the arrangement illustrated therein consists essentially of a suitable source of alternating current 1 and a load circuit 2 adapted to be connected together by a switch 3 or other suitable circuit maker and breaker. The load circuit contains a series capacitance 4 for neutralizing at least part of the reactance of a linear series inductance 5, which may be taken to represent the distributed self-inductance of a power circuit. The main impedance element of the circuit is a non-linear inductance 6 having a magnetically saturable core 7. These two elements may be considered as representing the primary winding and core of a transformer with an open-circuited secondary winding.

Sometimes when switch 3 is closed the current in the load circuit 2 behaves in a very abnormal manner while at other times it is just what would be expected. The abnormal current has a frequency which is different from the frequency of source 1 and has a relatively high magnitude compared with current which would be expected. This abnormal current when once started persists indefinitely.

I have found that when a resistance 9 of the proper value is connected across the capacitor, as by a switch 10, that the abnormal current never occurs no matter when or how often switch 3 is closed. I have also found that switch 10 may be opened after switch 3 has been closed and the abnormal current will not appear.

A rational theory which explains the abnormal current and the operation of my invention in suppressing it is as follows: Assume that switch 3 is closed at the exact instant when the voltage of the source 1 is zero and is increasing in a positive direction. Fig. 2 illustrates what happens thereafter.

Referring now to Fig. 2, it will be seen that as the supply voltage increases in a positive direction, the flux in core 7 increases similarly. The supply voltage is of course opposed by the voltage drop in the reactor 6. This consists largely of the voltage of self induction. As voltage of self induction is proportional to rate of change of flux and as all half cycles of supply voltage have the same numerical characteristics, the total change in flux through the reactor for each half cycle is substantially the same. During ordinary operating conditions the flux, in changing direction periodically, has substantially equal positive and negative values. However, when switch 3 is closed at the zero point of the supply voltage wave there was no negative flux in the core 7 and consequently during the first half cycle of supply voltage the core flux rises to a maximum value of substantially double its normal maximum positive value. If reactor winding 6, with its core 7, are typical of most alternating current machinery, they will be designed so as normally to operate just below the knee of the saturation curve of the core material. That is to say, maximum normal values of flux will not quite saturate the core each half cycle. Consequently, as the initial surge of flux passes the knee of the saturation curve (indicated by point $a$ in Fig. 2) the core 6 saturates and the magnetizing current, which heretofore has been negligible, increases very rapidly to a relatively very high value as shown by the magnetizing current curve in Fig. 2. This surge of magnetizing current flowing through the capacitor 4 puts a charge thereon. The voltage of this charge is indicated by the capacitor voltage curve in Fig. 2. The polarity of this charge is negative and this negative voltage in the circuit tends to decrease the flux in a positive direction and increase it in a negative direction. In other words, it acts like a substantially constant bias or battery in the circuit tending to lower the value of flux. Consequently during the next cycle of supply voltage, the flux does not reach as high a maximum value as it did during the first cycle of supply voltage and as shown in the drawings, its peak value just reaches the knee of the saturation curve and very little magnetizing current flows. This action continues during the third and fourth successive cycles of the supply voltage, the flux being continually depressed and its maximum values not reaching saturation. However, in the latter half of the fifth cycle the flux has been depressed so far that its peak value in the inverse direction just reaches the knee of the saturation curve. In the next half cycle, the knee of the curve is passed and a relatively large slug of magnetizing current flows in the reverse direction thereby reducing the charge on the capacitor to almost zero and in the next succeeding cycle the knee of the curve is again passed and the large slug of magnetizing current reverses the polarity of the charge on the capacitor. This then starts the cycle in the reverse direction and the flux gradually builds up until saturation is again reached in the positive direction whereupon the charge on the capacitor will again be reversed. This action will continue indefinitely resulting in low frequency pulses of abnormally high magnetizing current.

By connecting resistor 9 in parallel with the capacitor the charge on the capacitor may be made to leak off fast enough to permit the circuit to settle down to a normal steady state operation in which periodic saturation will not occur. Thus if resistor 9 has a low enough value enough of the charge on the capacitor 4 will leak off in a few cycles to prevent the flux from being depressed so far as to cause saturation in the negative direction. Losses in the circuit will then soon bring the flux to a symmetrical condition with respect to the zero axis in which equal maximum positive and negative values occur each cycle.

In Fig. 3, this action is illustrated by contrasting the core flux and capacitor voltage curves for values of capacitor shunt resistance which are on opposite sides of the critical value of resistance necessary to damp out and prevent the continuance of the abnormal magnetizing current. The dot and dash capacitor voltage curve and the light core flux curve represent the operation when the shunt resistance has a value which is just below its critical value. As will be seen from these two curves the capacitor voltage rapidly dies out while the flux rapidly approaches its normal steady state condition of symmetry with respect to the zero axis. As contrasted with these two curves the dashed curve and the heavy line curve represent respectively the capacitor voltage and the core flux for a value of shunt resistor just above the critical value. As will be seen from these curves, the capacitor voltage continues to reverse whenever the flux reaches values high enough to cause saturation and it will also be seen that extreme values of flux sufficiently high to cause saturation continue to occur indefinitely.

It is not necessary for the production of the abnormal magnetizing current that the switch 3 be closed exactly at the zero point of the supply voltage wave. All that is necessary is that the maximum value of the initial surge of flux following the application of voltage reach a value high enough to saturate the core 7. The occurrence of the abnormal phenomena is thus a function of the magnitude of the supply voltage, the angle at which it is applied and the magnetization or saturation characteristic of the core of the saturable inductive device in the circuit. By angle of application of the voltage is meant the point on the voltage wave at which the voltage is applied. The higher the supply voltage the further from the zero voltage point can the voltage be applied and still initiate the abnormal phenomena.

Furthermore, the abnormal phenomena can be started in other ways than by closing switch 3. For example, a fault, such as a short circuit or ground, on a previously normally operating circuit may so lower the voltage that when the fault is suddenly cleared the resulting reapplication of voltage will cause saturation and start the abnormal phenomena.

In Fig. 4, the relation of capacitive shunt resistance to capacitive reactance, in per unit values, for a series capacitor which neutralizes given amounts of series linear inductance in a distribution circuit is shown. The curve B is for a circuit having a relatively small amount of distributed inductance, while curve C is for a circuit having a relatively large amount of linear series inductance. In fact the values of inductance for B and C are approximately .2 and .4 respectively in the units in which capacitive reactance $$\frac{1}{C}$$

is indicated in Fig. 4. The curves B' and C' are similar to B and C except that they represent the relation when the saturable inductance has a differently shaped magnetization curve. The area below each curve is for normal operation and the area above each curve represents conditions of abnormal operation.

In the modification shown in Fig. 5, the resistor 9 is permanently across the capacitor 4. The linear inductance 5 and the resistance 8 are shown dotted to indicate that they are distributed throughout the circuit as is the case with actual power distribution circuits. In addition a secondary winding 11 is provided on the core 7 and this winding is connected to a load circuit through a switch 12. The windings 6 and 11 and the core 7 may be taken to represent a distribution transformer connected across a distribution or transmission circuit. Likewise source 1 may be considered a standard sixty cycle alternator in a central station.

The value of resistance 9 to insure normal operation can be obtained from Fig. 4 for various values of capacitive reactance and linear distributed inductance in the circuit. As will be seen from Fig. 4, the minimum value of this resistance will always be at least ten times the capacitive reactance measured in terms of $$\frac{1}{C}$$

That is to say it will always be about ten times the distributed inductance of the circuit. It will also be noted from Fig. 4 that if it is desired to use the capacitor to over-correct or over-compensate for linear inductance so as also to compensate for resistance in the circuit that higher values of shunt resistance may be used to insure normal operation.

In the modification shown in Fig. 6, the resistor 9 is connected in parallel with the primary winding of the distribution transformer instead of across the capacitor 4. This arrangement will also prevent the formation of the abnormal magnetizing currents because by choosing a suitable value of resistance the time constant of the circuit may be so changed as to decrease the capacitor voltage to zero before the oscillation can set in.

Fig. 7 is similar to Fig. 6 except that the preventive resistor is connected on the secondary side of the transformer instead of the primary side. Equally good results may be obtained by this arrangement.

In Fig. 8 the switch 10 is connected directly across the capacitor 4 instead of having the resistor 9 in series with it. By closing this switch before the switch 3 is closed and opening it after the switch 3 is closed the formation of abnormal magnetizing currents will be prevented by preventing the building up of a biasing charge on the capacitor due to the initial flux transient.

In Fig. 9, an automatic control scheme is shown wherein the short-circuiting of the capacitor 4 is controlled automatically in response to harmonic frequency currents in the circuit. Thus as shown, the capacitor 4 is adapted to be short-circuited by a normally open contactor 13 arranged to be energized through suitable filters 14 from a current transformer 15 in the circuit. By having these filters 14 responsive to the typical frequencies of the abnormal exciting current the contactor 13 may be closed whenever these currents occur thereby short-circuiting the capacitor. This, of course, immediately drains off the charge on the capacitor and allows the flux in the core 7 to settle down quickly to a steady state condition of symmetrical oscillation on both sides of the zero voltage axis.

By the term "series capacitor" I mean to include a capacitor which is effectively connected in series in the circuit by any well-known arrangement. For example, it is common practice to interpose a transformer between a series capacitor and a circuit in cases where the circuit voltage does not permit of the operation of an economical sized capacitor.

While I have shown and described particular embodiments of my invention, it will be obvious to those skilled in the art that changes and modifications can be made therein without departing from my invention and consequently, I aim in the appended claims to cover all such changes and modifications as fall within the true spirit and scope of my invention.

What I claim as new and desire to secure by Letters Patent of the United States, is:

1. In combination, a source of alternating current, a saturable core inductance, a circuit containing series linear inductance and series capacitance, means for connecting said saturable core inductance to said source through said circuit, the maximum instantaneous voltage of said source and the magnetization characteristic of said saturable core inductance being such that within certain angles of application of the voltage of said source to said saturable core inductance said inductance will saturate to such an extent that the magnetizing current it draws through said series capacitance will put such a charge thereon as eventually to depress the flux in the core of said saturable inductance to a value sufficient to cause saturation in the opposite direction whereby abnormal frequency and magnitude pulses of magnetizing current flow in said circuit, and means for suppressing the charge on said capacitor to such an extent as to inhibit the continuance of said abnormal magnetizing current.

2. In combination, a source of alternating current, a load circuit, a switch for connecting said circuit to said source, said circuit having a substantial amount of linear inductive reactance at the fundamental frequency of said source, a capacitor connected in series in said circuit, said capacitor having a reactance which is substantially equal to said inductive reactance at the fundamental frequency of said source, a magnetically saturable iron core inductive device connected in said circuit, said device having such a magnetization characteristic that when the voltage of said source is applied thereto at a time when its voltage wave is at or near the zero point said core will saturate thereby initiating abnormal magnitude and frequency magnetizing current of said inductive device in said circuit, and electrical conducting means connected to said circuit for excluding said abnormal magnetizing current from said circuit.

3. In combination, a standard commercial frequency alternating current power supply station, a distribution circuit, a switch for connecting said circuit to said power station, a substantially unloaded distribution transformer connected across said circuit, a series capacitor connected in said circuit for substantially neutralizing the distributed inductance of said circuit, and auxiliary electrical conducting means connected to said circuit for preventing the existence in said circuit of abnormal frequency and magnitude transformer exciting current resulting from the interaction of said capacitor with the effect of magnetic saturation of the core of said distribution transformer when the voltage of said power station is applied to said transformer near the zero voltage point of the voltage wave of said power station.

4. In combination, a standard commercial frequency alternating current power supply station, a distribution circuit, a switch for connecting said circuit to said power station, a substantially unloaded distribution transformer connected across said circuit, a series capacitor connected in said circuit for substantially neutralizing the distributed inductance of said circuit, and means for placing a sufficient load on said circuit for preventing the existence in said circuit of abnormal frequency and magnitude transformer exciting current resulting from the interaction of said capacitor with the effect of magnetic saturation of the core of said distribution transformer when the voltage of said power station is applied to said transformer near the zero voltage point of the voltage wave of said power station.

5. In combination, a standard commercial frequency alternating current power supply station, a distribution circuit, a switch for connecting said circuit to said power station, a substantially unloaded distribution transformer connected across said circuit, a series capacitor connected in said circuit for substantially neutralizing the distributed inductance of said circuit, and a relatively small load connected across said circuit on one side of said transformer for preventing the existence in said circuit of abnormal frequency and magnitude transformer exciting current resulting from the interaction of said capacitor with the effect of magnetic saturation of the core of said distribution transformer when the voltage of said power station is applied to said transformer near the zero voltage point of the voltage wave of said power station.

6. In combination, a standard commercial frequency alternating current power supply station, a distribution circuit, a switch for connecting said circuit to said power station, a substantially unloaded distribution transformer connected across said circuit, a series capacitor connected in said circuit for substantially neutralizing the inductance of said circuit, and a relatively small high resistance load connected across said circuit on one side of said transformer for preventing the existence in said circuit of abnormal frequency and magnitude transformer exciting current resulting from the interaction of said capacitor with the effect of magnetic saturation of the core of said distribution transformer when said switch is closed near the zero voltage point of the voltage wave of said power station.

7. In combination, a standard commercial frequency alternating current power supply station, a distribution circuit, a switch for connecting said circuit to said power station, substantially unloaded distribution transformer connected across said circuit, a series capacitor connected in said circuit for substantially neutralizing the distributed inductance of said circuit, and a relatively high resistance connected in shunt with said capacitor for preventing the existence in said circuit of abnormal frequency and magnitude transformer exciting current resulting from the interaction of said capacitor with the effect of magnetic saturation of the core of said distribution transformer when the voltage of said power station is applied to said distribution transformer near the zero voltage point of the voltage wave of said power circuit.

8. In combination, a standard commercial frequency alternating current power supply station, a distribution circuit, a switch for connecting said circuit to said power station, a substantially unloaded distribution transformer connected across said circuit, a series capacitor connected in said circuit for substantially neutralizing the distributed inductance of said circuit, and means for momentarily short-circuiting said capacitor so as to prevent the presence in said circuit of abnormal frequency and magnitude transformer exciting current resulting from the interaction of said capacitor with the effect of magnetic saturation of the core of said distribution transformer when the voltage of said power station is applied to said transformer.

9. In combination, a standard commercial frequency alternating current power supply station, a distribution circuit, a switch for connecting said circuit to said power station, a substantially unloaded distribution transformer connected across said circuit, a series capacitor connected in said circuit for substantially neutralizing the distributed inductance of said circuit, a normally open switch for short-circuiting said capacitor, and means responsive to abnormal frequency and magnitude transformer exciting current resulting from the interaction of said capacitor with the effect of magnetic saturation of the core of said distribution transformer when the voltage of said power station is applied to said transformer near the zero voltage point of the voltage wave of said power station for closing said normally open switch for short-circuiting said capacitor.

ROY C. BUELL.